(12) United States Patent
Krausz

(10) Patent No.: US 6,802,174 B2
(45) Date of Patent: Oct. 12, 2004

(54) METHOD OF ADMINISTERING FIRST-AID IN A VEHICLE

(76) Inventor: Sam Krausz, 445 Park Ave., Brooklyn, NY (US) 11205

( * ) Notice: Subject to any disclaimer, the term of this patent is extended or adjusted under 35 U.S.C. 154(b) by 211 days.

(21) Appl. No.: 10/085,899

(22) Filed: Mar. 1, 2002

(65) Prior Publication Data
US 2003/0164628 A1 Sep. 4, 2003

(51) Int. Cl.⁷ ............................................. B65B 3/04
(52) U.S. Cl. ..................... 53/474; 53/449; 206/308.1; 206/570
(58) Field of Search ................ 206/570, 308.1, 206/457; 53/449, 474

(56) References Cited

U.S. PATENT DOCUMENTS

| | | | | |
|---|---|---|---|---|
| 3,116,849 A | * | 1/1964 | Brewer et al. | 220/210 |
| 4,180,299 A | * | 12/1979 | Tolerson | 312/242 |
| 5,201,414 A | * | 4/1993 | Kaszubinski | 206/308.1 |
| 5,246,269 A | * | 9/1993 | DeBoer et al. | 297/227 |
| 5,346,074 A | * | 9/1994 | Overholser | 211/40 |
| 5,516,191 A | * | 5/1996 | McKee | 297/188.15 |
| 6,347,590 B1 | * | 2/2002 | D'Annunzio et al. | 108/44 |
| 6,497,443 B2 | * | 12/2002 | Worrell et al. | 296/37.8 |

OTHER PUBLICATIONS

Geocaching.com, hide and seek storage location of a ammunition box containg a first aid kit in a CD case, Hidden Feb. 16, 2002.*
Medi CD kit, www.thelogoedcd.com, no date given.*
Copy of web page, The logoed CD, www.thelogoedcd.com, date unknown.*

* cited by examiner

Primary Examiner—Stephen F. Gerrity
Assistant Examiner—Paul Durand
(74) Attorney, Agent, or Firm—Myron Amer P.C.

(57) ABSTRACT

CD holders with musical content are within convenient reach in a vehicle armrest, and this convenience is used to advantage for a CD holder commingled with the musical variety, but with a substantial first-aid contents; thus, first-aid treatment in a vehicle is made as readily accesible as reaching for a CD.

1 Claim, 3 Drawing Sheets

METHOD OF ADMINISTERING FIRST-AID IN A VEHICLE

The improvements of the present invention contribute to facilitating the administration of first aid treatment, primarily during or associated with the operation of a vehicle in making accessible a first aid kit to the driver of the vehicle.

EXAMPLE OF THE PRIOR ART

There is recognized utility in a first aid kit for treatment of minor injuries on the occasion of their occurrence, which hopefully is infrequently. Thus, during periods of non-use, the first aid kit is in an assigned storage location, such as preparatory to home use, in a kitchen or bathroom cabinet, or even in a workshop-garage location. Exemplary of this practice is U.S. Pat. No. 5,931,304 for "First Aid Kit And Method Of Replenishing" issued to Hammond on Aug. 3, 1999, in which posted notices are used as reminders of the storage location of the first aid kit.

The home-use first aid kit should also be taken along for possible use during operation of the family car, but through neglect this is often not done, possibly because there is no convenient non-use location, except in the trunk in which it will undesirably move about, in the glove compartment in which there might not always be enough room for it to fit or other such circumstances which result in the absence of a first aid kit in a vehicle.

Broadly, it is an object of the present invention to overcome the foregoing and other shortcomings of the prior art.

More particularly, it is an object to provide a first aid kit primarily for vehicle use that is convenient to store during non-use and having noteworthy accessibility on an occasion when it is required to be used, all as will be better understood as the description proceedings.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
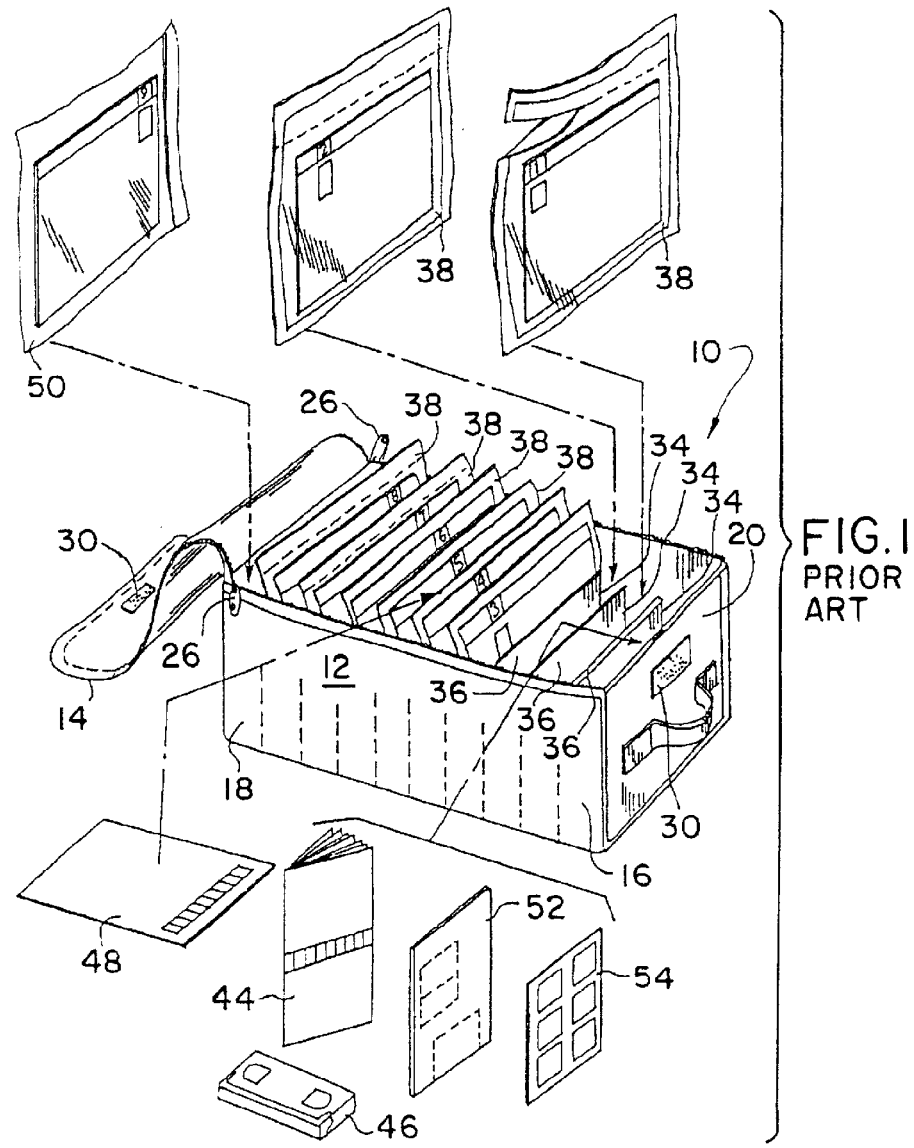
FIG. 1 is a perspective view of a prior art first-aid kit.

Referring first to FIG. 1, a perspective view of a prior art first-aid kit 10 is seen. The first-aid kit 10 is carried in a case 12 which has a top 14 and a base 16 having a bottom, two sides 18, and two ends 20. The sides 18 of the base 16 are generally rectangular and the ends 20 of the base 16 are generally square.

The top 14 is secured to a base 16 by use of a closure means which consists of a pair of zippers 26 which secure the top 14 to the sides 18. A first end of the top 14 is secured to the base by a living hinge integrally formed with that end of the base 16. The end of the top 14 opposite the living hinge is secured to the base 16 by a hook and loop style fastener 30 contained on an over-flap. Thus, in use a user simply pulls the over-flap over the top 14 thereby releasing the hook and loop fastener 30. On further pressure upward and rearward, the zippers 26 are automatically opened thus providing quick access to the content of the first-aid kit 10.

The base 16 of the first-aid kit 10 defines a plurality of compartments 34. Each compartment 34 is sequentially oriented in front of the subsequent compartment. By so orienting the compartments 34 in this manner, a card catalogue/file cabinet like effect is provided in which contents can be carried in each compartment 34 in an easy to identify, upright position. Additionally, in each of the compartments 34, flexible walls 36 are used such that contents of different thicknesses can fit into each of the compartments 34.

The contents of the fist-aid kit 10 include a plurality of packs 38. The first-aid kit 10 further contains a detailed guidebook 44 which explains the use of the medical products in different types of first-aid situations. In a further preferred embodiment, the first-aid kit 10 contains an instructional video 46 which helps train the user on the use of the first-aid kit 10. An overview card 48 is provided which contains an overview of the first-aid kit 10. In addition, an extra pack 50 can be provided.

The first-aid kit further contains a magnetic card 52, which includes magnetic identifiers, a locator for the first-aid kit, and a card having background medical information regarding family members. Further, a plurality of self-adhesive identifiers 54 are provided which can be placed in various locations, such as in kitchen cabinets, bathroom cabinets and the like, to quickly identify where the first-aid kit 10 is stored.

Although generally useful for the purposes intended, the typical non-use storage locations of the described prior art first-aid kit 10, namely kitchen and bathroom cabinets and, in factory and business office locations, typically necessitating the use of the noted location-identifying self-adhesive identifiers 54, is a significant shortcoming, particularly its inappropriateness for use by a motorist in an automobile or like vehicle in which a first-aid emergency will typically arise.

Addressing this shortcoming, there is proposed a method of making readily accessible-to-use first-aid procedures in an automobile using commercially available plastic compact disc (CD) holders and an auto armrest storage site, all as will be bettor understood as the description proceeds.

Figure 3:
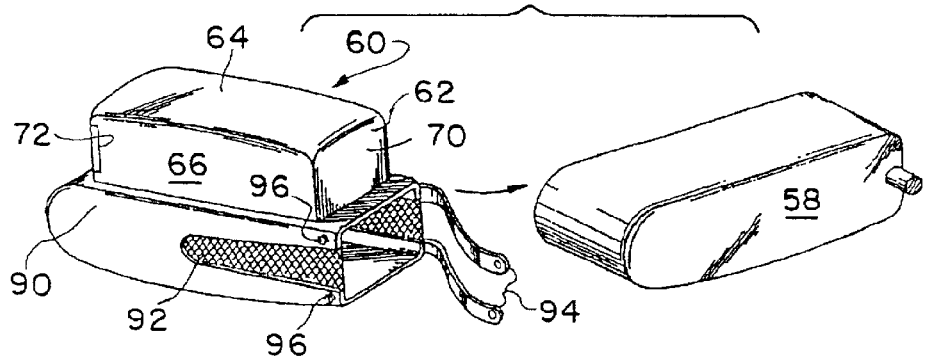
FIG. 3 is an "exploded" perspective illustrating the armrest and the detached attachment.
Figure 5:
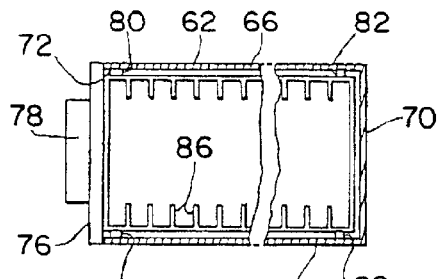
FIG. 5 is a partial section looking down on the structure, generally along the line 5—5 of FIG. 4.
Figure 2:
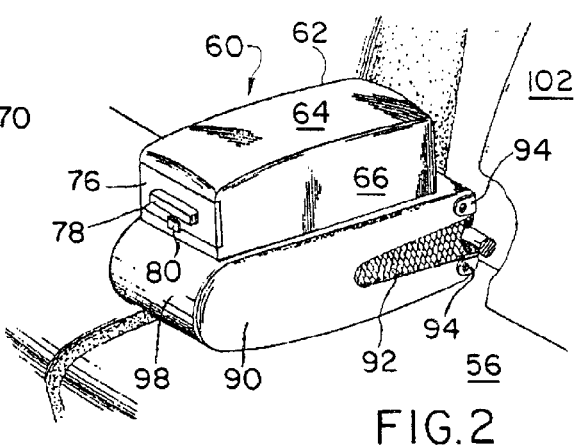
FIG. 2 is a perspective of a portion of a vehicle seat having an armrest used in the practice of the inventive method.
Figure 4:
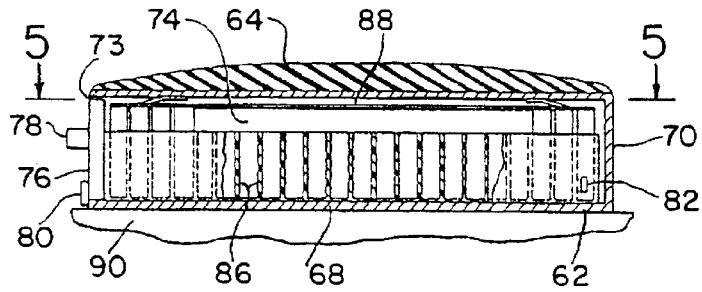
FIG. 4 is a reduced-scale longitudinal section showing the box and drawer therewithin.

Reference will be had first to FIGS. 2 and 3, wherein the numeral 56 designates a typical vehicle front seat and the numeral 58 denotes a typical armrest (FIG. 3) conventionally provided centrally of the vehicle front seat and thus in close proximity to whatever tape, disc, etc., player (not shown) is used in the vehicle. The attachment is indicated as a whole by the numeral 60 and includes a fore-and-aft elongated box-like structure 62 (hereinafter a box) having a top 64, opposite side walls 66, a bottom 68, a closed rear end 70 and an open front 72, the walls, bottom and rear end cooperate to bound a storage compartment 74, and the top edges on the open front 72 bounds an opening 73 into the storage compartment 74. A fore-and-aft elongated drawer 76 is received in the box 62 via the front end 72 for selective fore-and-aft sliding movement between open and closed positions. Alternatively in lieu of sliding movement, a pivotally mounted cover (not shown) can be used as a closure for the compartment 74 and, in its closed position serve as an armrest similar to the top 64 of box 62. The drawer is fitted at its front end with a handle 78 for convenience in opening the drawer. Any suitable form of latch may be provided for holding the drawer normally in closed position. Releasable stops 80 and 82 are provided interiorly of the structure for preventing unwanted forward escape of the drawer completely from the box.

Figure 6:
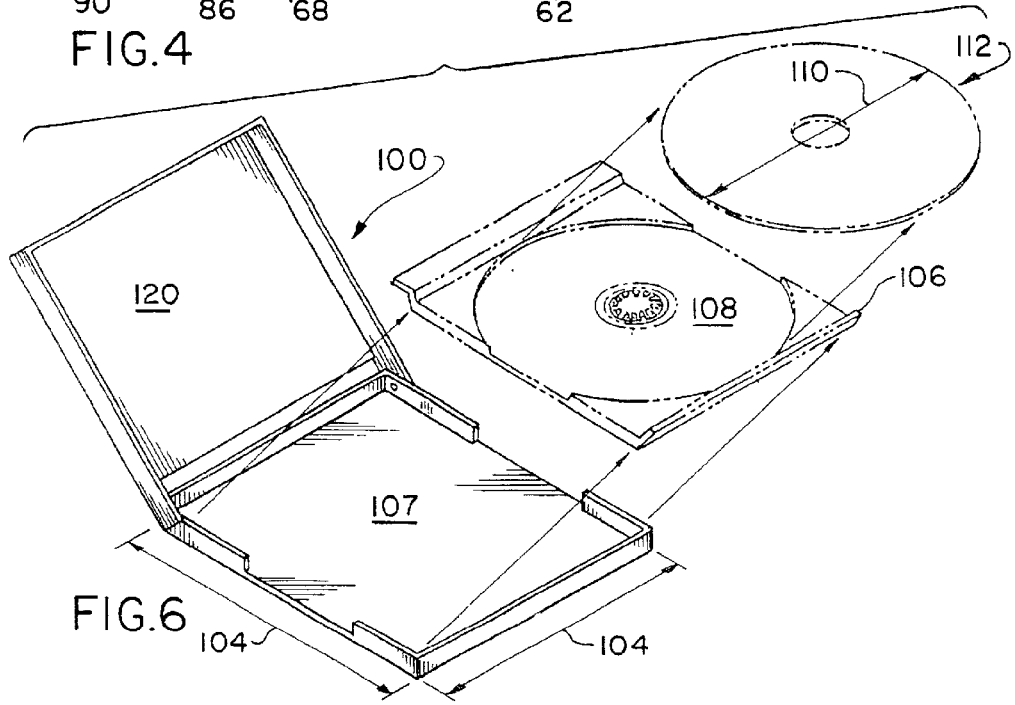
FIG. 6 is an "exploded" perspective view of a disassembled commercially sold CD cassette illustrating the holder component used in accordance with the present invention and the CD component disregarded to make room for the first aid kit component of the present invention.
Figure 7:
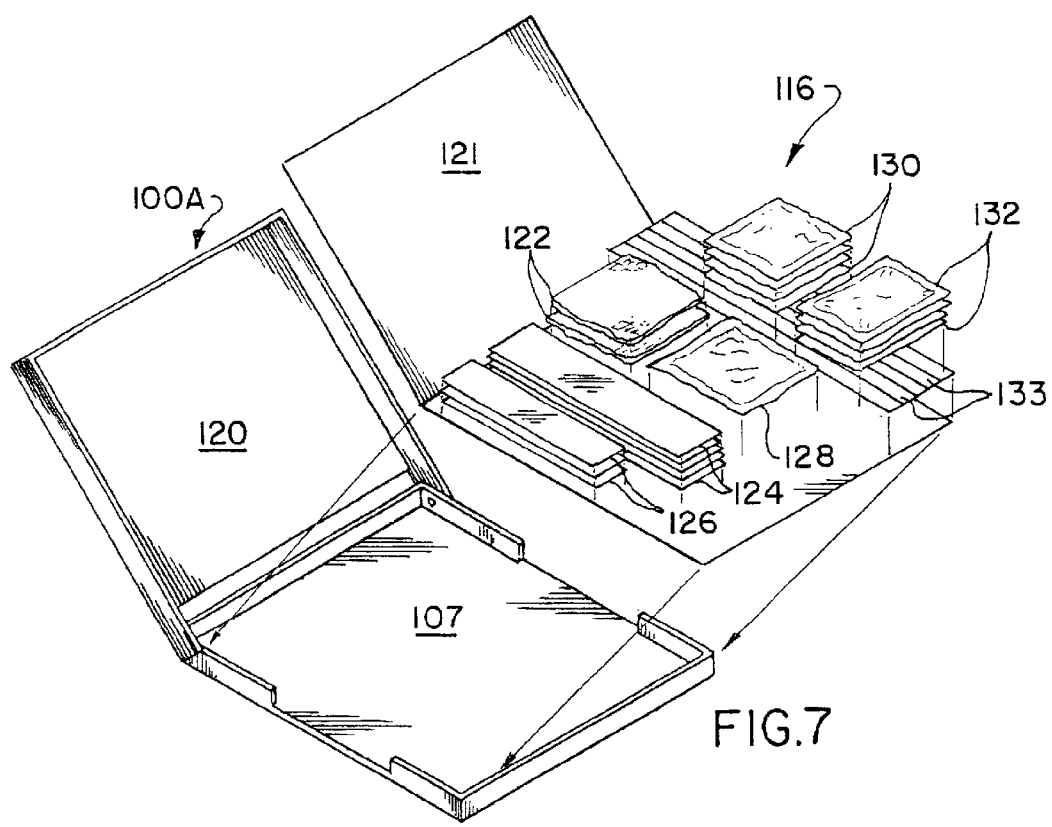
FIG. 7 is an "exploded" perspective view illustrating the assembly of the first aid kit component in a CD holder component as illustrated in FIG. 6 for practicing the method of the present invention.
Figure 8:
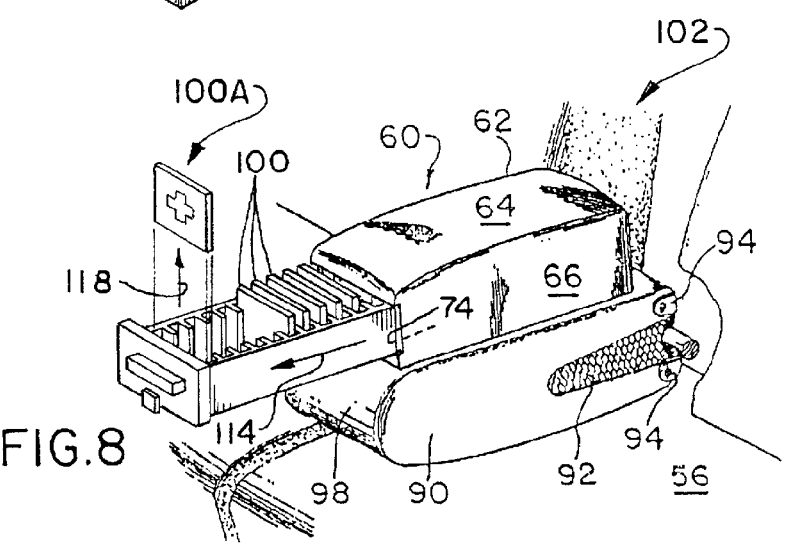
FIG. 8 is a perspective view illustrating the practicing of the inventive method of using the assembly of FIG. 7.

The drawer is formed interiorly with dividers 86 for containing CD holders subsequently to be described in detail in reference to FIGS. 6–8. The top wall 64 carries at its underside a spring-loaded strip 88 for engaging the tops of the CD holders to prevent them from rattling in both the up and down positions of the armrest.

The attachment structure is held in place by sleeve-like means 90 secured to a box bottom and depending therefrom. This means (sleeve) is dimensioned to fit the armrest in such fashion as to be capable of being slipped over the armrest from front to rear (see FIG. 2). Opposite sides of the sleeve may be fitted with elasticized gores 92 to enable the sleeve to more firmly grip the armrest in order to firm up the attachment or mounting and to prevent unwanted displacement thereof. As further augmentation of the mounting, the rear or open end of the sleeve may be equipped with straps 94 that embrace the rear of the armrest, being connected to the side of the sleeve as by snap buttons 96; although, any other type of securing means may be provided. The sleeve is closed at its front end as at 98 so as to substantially completely enclose the armrest.

The inventive method, now to be described is practiced using the described auto armrest construction 58, 60 or using any equivalent construction, even an auto OEM armrest having an integral storage compartment similar to compartment 74, and further using to advantage jointly therewith standard sized and shaped CD holders, individually and collectively designated 100.

More particularly, the inventive method has as its object making readily accessible-to-use first-aid procedures in an auto 102 comprising the steps of: purchasing plural commercially available plastic CD holders 100 of an established uniform rectangular shape, as noted at 104, and a dimensionally sized insert 106 correlated to an established uniform circular shape, as noted at 108, and dimensional size 110 of a CD 112 content therein; mounting to partake of a pivotal transverse or alternatively sliding closing movement 114 in relation to the storage compartment opening 73 a cover 64 for the storage compartment 74; disposing in the storage compartment 74 the plural CD holders 100; and commingling with the CD holders 100 in the storage compartment 74 at least one holder 100A of the same size 107, and shape 104 characterized by having first-aid-treating contents 116 therein; whereby the cover 64 serves as an armrest and, when in an open condition, a user has the same extent of accessibility to the first-aid-treating contents 116 as is afforded to the CDs.

More particularly, a motorist in a first aid emergency situation has ready access to the armrest storage compartment 74, and will lift, as noted at 118, the CD holder 100A therefrom, and upon opening the cover 120 will have available for use between a paper liner 121 two gauze pads 122, five ¾" or three ½" band-aids 124, 126, headache medication 128, four wipes 130, four alcohol pads 132 and adhesive strips 133, the foregoing having been found to fit in the space in the holder 100A vacated by the removal of the CD insert 106 with its CD 112.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of making readily accessible-to-use first-aid procedures for an auto comprising the steps of:

providing plural commercially available plastic CD holders of an established uniform rectangular shape and dimensional size correlated to an established uniform circular shape and dimensional size of a CD content therein;

establishing a storage site between an auto driver and front passenger's seats constituted of walls bounding a storage compartment with top edges thereon bounding an opening into said storage compartment;

arranging a cover for opening and closing movements in relation to said storage compartment opening;

disposing in said storage compartment said commercially available plural CD holders with CD contents as provided;

emptying the CD content from one of the provided commercially available CD holders and placing inside first-aid treating items constituted of a bulk of a lesser extent than a space vacated by the removal of said CD contents from one of the commercially available CD holders; and commingling with said commercially available CD holders in said storage compartment at least said one commercially available CD holder having first-aid-treating contents therein;

whereby said cover serves as an arm rest and when in an open condition a user has the same extent of accessibility to said first-aid-treating contents as is afforded to said CDs.

* * * * *